Aug. 18, 1964 E. P. ARTHUR ETAL 3,145,157
ION SENSITIVE ELECTRODE
Filed Sept. 26, 1961
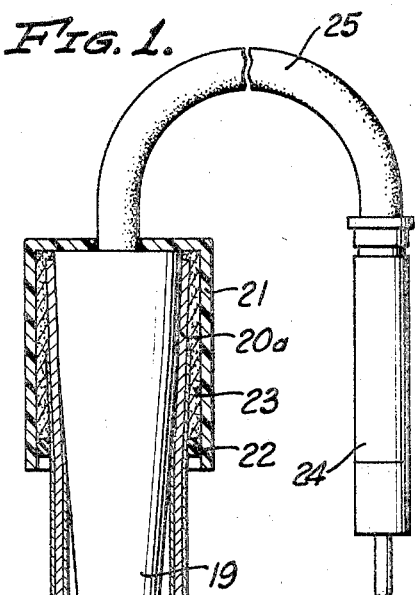
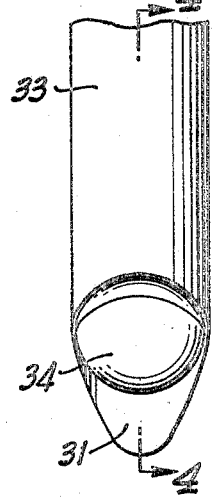
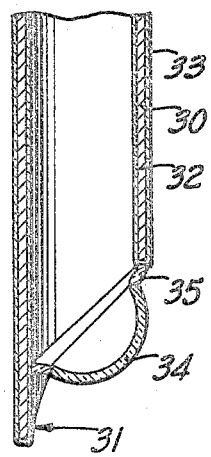
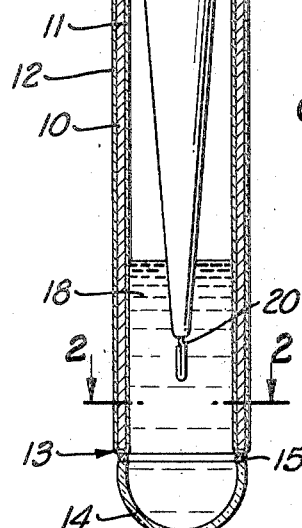
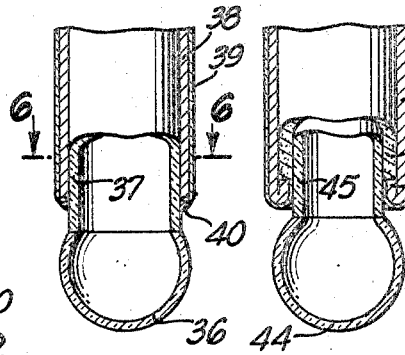
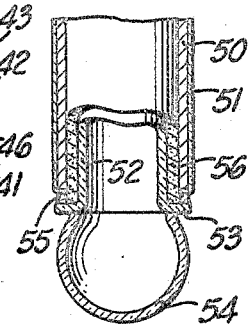
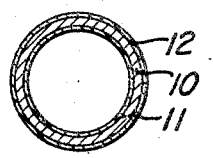
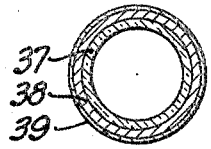
INVENTORS
EDWIN P. ARTHUR,
JOHN E. LEONARD
BY THEIR ATTORNEYS
HARRIS, KIECH, RUSSELL & KERN

3,145,157
ION SENSITIVE ELECTRODE
Edwin P. Arthur and John E. Leonard, Fullerton, Calif., assignors to Beckman Instruments, Inc., a corporation of California
Filed Sept. 26, 1961, Ser. No. 140,945
10 Claims. (Cl. 204—195)

This invention relates to electrodes for ion potential measurements such as pH measurements and the like, and in particular, to electrodes of the type known as glass electrodes, so called because of the ion sensitive glass membrane utilized therein.

A glass electrode normally comprises a glass tube with a blown bulb of glass at one end thereof. The bulb, which is the ion sensitive membrane, is sealed to the stem tube directly or with an intermediate or grade glass therebetween. A suitable electrolyte is carried within the tube filling the bulb, and a half cell provides a circuit connection from the electrolyte to an external cable. Typical glass electrodes are shown in U.S. Patents Nos. 2,256,733 and 2,755,243. A typical process for forming the glass membrane is shown in U.S. Patent No. 2,346,470.

The conventional glass electrodes are fragile. It is an object of the present invention to provide a strong and durable electrode structure. A specific object is to provide a glass electrode having a metal stem to which the ion sensitive glass membrane is affixed.

It is a particular object of the invention to provide a glass electrode suitable for ion potential measurements and including a metal supporting tube with an external and internal glass cover or coating and an ion sensitive glass membrane closing one end of the tube to provide a chamber for the electrolyte. Another object is to provide such a structure in which the glass membrane may be sealed directly to the glass cover or may be mounted by means of an intermediate grade glass seal. A further object is to provide such a structure in which the glass cover and membrane may comprise a unitary glass surface with only the membrane closing the end of the tube being ion sensitive.

It is an object of the invention to provide a glass electrode having a glass coated metal tube stem in which the coating is applied by firing a glaze or enamel onto the metal. Another object is to provide such a structure in which the inner glass coating is provided by a glass tube positioned within the metal tube and fixed in place therein. A further object is to provide such a structure in which the glass membrane may be applied after the metal tube has been coated or, alternatively, be formed on the glass tube prior to fixing the glass tube within the metal tube.

It is an object of the invention to provide a glass electrode having a metal stem with a tip portion of the stem projecting beyond the glass membrane to enhance the mechanical protection afforded by the metal stem. It is an object to produce ion sensitive membranes of small size and elongate or needle form in an assembly of high mechanical strength.

The invention also comprises novel details of construction and novel combinations and arrangements of parts, which will more fully appear in the course of the following description. The drawing merely shows and the description merely describes preferred embodiments of the present invention which are given by way of illustration or example.

In the drawing:
FIG. 1 is a side elevation of a preferred form of the invention;
FIG. 2 is a sectional view taken along the line 2—2 of FIG. 1;
FIG. 3 is a partial side view of an alternative form of the invention;
FIG. 4 is a sectional view taken along the line 4—4 of FIG. 3;
FIG. 5 is a partial sectional view of another alternative form;
FIG. 6 is a sectional view taken along the line 6—6 of FIG. 5; and
FIGS. 7, 8 and 9 are partial sectional views of additional alternative forms.

The instrument of FIG. 1 has a stem comprising a metal supporting tube 10 with an internal glass cover or coating 11 and an external glass cover or coating 12. The covers meet to enclose the end 13 of the tube and a conventional ion sensitive glass membrane bulb 14 is fixed to the stem at the end of the tube. The glass covers on the metal tube typically may be a fired glaze or enamel applied in the conventional manner. The bulb 14 is produced by dipping the end of the tube into a glass melt, picking up a gob of glass, and blowing the molten glass to form the bulb, as more fully described in the aforementioned U.S. Patent No. 2,346,470. The bulb may be affixed directly to the end of the stem or an intermediate or grade glass seal may be used in the conventional manner. In making a grade glass seal, a bulb of the grade glass is first blown at the end of the stem. This bulb is then ground away to leave a small ring 15 of the grade glass at the end of the stem. Then a second bulb, which is to be the ion sensitive membrane, is formed at the grade glass ring. This form of construction is conventionally used to provide a ring having a coefficient of expansion intermediate that of the membrane and the stem. The particular coating glass utilized should be selected for high electrical resistance and a coefficient of expansion compatible with that of the metal and the membrane glass.

The electrode of FIG. 1 is partly filled with an electrolyte 18 and a half cell is carried in a member 19 positioned within the tube and dipping into the electrolyte. The member 19 is typically of glass with a conductor 20 sealed in the lower end thereof. The member 19 fits into the flared upper end 20a of the stem which is closed with a cap 21, a seal ring 22 and a sealing compound 23. An electrical connector 24 is coupled to the electrode by a cable 25 with the central conductor of the cable joined to the conductor 20 and with the outer or shield conductor of the cable connected to the metal tube 10.

The electrode structure of the invention may be used with any of various ion sensitive glasses, electrolytes and half cells. Typically the bulb 14 may be of a hydrogen ion sensitive glass, the electrolyte an aqueous potassium chloride solution with a buffer, and the half cell a silver wire with a layer of silver chloride fused thereon.

In a typical structure, the metal tube comprised a steel (Type 1015) seamless tube one-half inch O.D. and 0.035 inch wall thickness coated internally and externally with a glass enamel approximately 0.020 inch thick, with a one-half inch diameter hemispherical glass bulb formed at one end.

In the embodiment described above, the glass bulb and the glass coating are made of different glass compositions, which is the most economic arrangement using generally known techniques. However, it should be noted that it is possible to form the glass coating on the metal tube and the membrane which closes an end of the tube of the same glass, which would normally be ion sensitive. But all of the glass except the working membrane at the tube end could then be desensitized, as by a high dielectric coating of a resin or the like.

An alternative embodiment of the invention having a different shape of stem is shown in FIGS. 3 and 4. A metal tube 30 has an end cut off at an angle to form a projecting tip portion 31. The tube has an internal glass cover 32 and an external glass cover 33 is in the embodiment of FIG. 1. An ion sensitive glass membrane 34 is fixed to the end of the tube with a grade glass seal 35 in the conventional manner. The projecting tip portion 31 provides protection for the glass membrane 34 which, in most instances, is rather fragile.

Another embodiment of the invention is shown in FIG. 5. An ion sensitive glass bulb 36 is formed on a glass tube 37. The glass tube is then positioned within a metal tube 38 having a glass coating 39 on the exterior thereof. The glass tube is fixed within the metal tube as by cementing or firing. If the firing technique is used, the firing temperature should be high enough to provide a mechanical bond but below that which would increase the viscosity of the glass to a point where formation of pinholes and leaks might occur, i.e., between the softening point and the working point. A seal 40 may be provided between the glass tube 37 and the glass cover 39. The seal may comprise a glass of relatively low melting temperature of the type commonly referred to as solder glass. A typical solder glass is described in U.S. Patent No. 2,889,952.

Difficulties are sometimes encountered in obtaining a smooth fired glass coating on the end of a metal tube. This problem may be simplified by providing an inwardly turned flange or a fully doubled back flange at the end of the metal tube. A typical structure is shown in FIG. 7, wherein the end 41 of a metal tube 42 is turned in on itself to provide a relatively large rounded end surface for the glass cover 43. An ion sensitive glass membrane 44 is formed at the end of a glass tube 45 which is fixed within the metal tube. Any open space between the glass and metal tubes may be filled with a sealing compound 46 or used to contain a reference electrolyte for a combination electrode, such as is shown in U.S. Patent No. 2,755,243.

Another alternative structure is shown in FIG. 8. A metal tube 50 has an external glass coating 51 and a glass tube 52 has an outwardly turned flange 53 with an ion sensitive membrane 54 affixed thereto. The glass tube is positioned within the metal tube and is fixed thereto, as by a glass solder seal 55. A sealing compound such as wax, or asphalt, or silicone resin 56 may be used to fill gaps between the two tubes.

The glass membrane, such as 36, 44, 54, may be applied to the glass tube either before or after the glass tube is fixed to the metal tube.

It is readily apparent that a glass tube, such as is shown in FIGS. 5, 7 or 8, may be used with a metal tube of the form shown in FIG. 3 to provide an electrode with a projecting guard for the membrane carried by the glass tube.

FIG. 9 illustrates another embodiment of the invention wherein the ion sensitive membrane is in the form of an elongate needle. A metal tube 60 has a glass coating 61 on the exterior and a similar glass coating 62 on the interior. A quantity of ion sensitive glass is adhered to the end of the tube and formed into a long hollow needle 63 which is sealed at the tip end 64. An electrode of this shape is useful for biochemical investigations, exploration of body fluids of small animals, and the like. In a typical electrode, the metal tube 60 is 1 mm. diameter and the ion sensitive glass at the end 64 is about 0.2 mm. diameter.

The electrode structure of the present invention provides a glass electrode assembly which is extremely rugged and practically unbreakable except by direct impact on the glass membrane itself. The metal tube of the stem may be connected to the shield of the electrode conductor in some styles of amplifier circuits to provide electrical shielding for the electrode as well as improved mechanical strength. At the same time, all exposed surfaces of the structure are glass, preventing contamination of solutions and providing long life for the devices.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:
1. In a glass electrode for ion potential measurements, including an electrolyte and a half cell contacting the electrolyte, the combination of:
   a metal supporting tube having an external glass coating and an internal glass coating with said internal and external coatings joined to cover an end of the tube;
   and an ion sensitive glass membrane carried on said tube at said end, with said internal coating and membrane providing a chamber for the electrolyte.

2. In a glass electrode for ion potential measurements, including an electrolyte and a half cell contacting the electrolyte, the combination of:
   a glass enamel coated metal supporting tube, with said coating covering an end of the tube and the inner and outer surfaces of the tube adjacent said end;
   and an ion sensitive glass membrane carried on said tube at said end, with said tube and membrane providing a chamber for the electrolyte.

3. In a glass electrode for ion potential measurements, including an electrolyte and a half cell contacting the electrolyte, the combination of:
   a metal supporting tube having an inwardly turned end and a glass coating on said end and on the exterior surface of said tube;
   a tube of glass fixed within said metal tube and sealed thereto adjacent said end;
   and an ion sensitive glass membrane carried on said glass tube at said end, with said glass tube and membrane providing a chamber for the electrolyte.

4. In a glass electrode for ion potential measurements, including an electrolyte and a half cell contacting the electrolyte, the combination of:
   a metal supporting tube having a portion doubled back within the tube to form an end, and having a glass coating on said end and on the exterior surface of said tube;
   a tube of glass fixed within said metal tube and sealed thereto at said doubled back portion;
   and an ion sensitive glass membrane carried on said glass tube, with said glass tube and membrane providing a chamber for the electrolyte.

5. In a glass electrode for ion potential measurements, including an electrolyte and a half cell contacting the electrolyte, the combination of:
   a metal supporting tube having a glass coating on the exterior surface extending to one end thereof;
   a tube of glass fixed within said metal tube, said glass tube having an outwardly turned flange sealed to said metal tube coating at said end;
   and an ion sensitive glass membrane carried on said glass tube, with said glass tube and membrane providing a chamber for the electrolyte.

6. In a glass electrode for ion potential measurements, including an electrolyte and a half cell contacting the electrolyte, the combination of:
   a metal tube having an open end with a projecting tip, said tube having an external glass cover and an internal glass cover with said internal and external covers joined to cover said tip and end;
   and an ion sensitive glass membrane carried on said tube at said end, with said tip projecting beyond said membrane, and with said internal cover and membrane providing a chamber for the electrolyte.

7. In a glass electrode for ion potential measurements, including an electrolyte and a half cell contacting the electrolyte, the combination of:
   a metal tube having an open end with a projecting tip, said tube having a glass enamel coating covering said end and the inner and outer surfaces of the tube adjacent said end;
   and an ion sensitive glass membrane carried on said tube and sealed to said coating at said end, with said tip projecting beyond said membrane, and with said coated tube and membrane providing a chamber for the electrolyte.

8. In a glass electrode for ion potential measurements, including an electrolyte and a half cell containing the electrolyte, the combination of:
- a metal tube having an open end with a projecting tip, said metal tube having an external glass cover and an internal glass cover with said internal and external covers joined to cover said end, and with said internal cover comprising a tube of glass fixed within said metal tube and sealed thereto adjacent said end;
- and an ion sensitive glass membrane carried on said glass tube, with said tip projecting beyond said membrane, and with said glass tube and membrane providing a chamber for the electrotlyte.

9. A glass electrode for ion potential measurements, including a metal supporting tube having a coating of glass covering the inner and outer surface adjacent an end thereof, and an ion sensitive glass membrane carried at said end and sealed to said glass coating.

10. In a glass electrode for ion potential measurements including an electrolyte and a half cell contacting the electrolyte, the combination of:
- a stem in the form of a metal supporting tube having an external glass coating and an internal glass coating with said internal and external coatings joined to cover an end of the tube;
- an ion sensitive glass membrane carried on said tube at said end, with said internal coatings and membrane providing a chamber for the electrolyte; and
- a shielded cable for connecting said electrode to a measuring unit with the cable conductor connected to said half cell and the cable shield connected to said metal tube.

References Cited in the file of this patent

UNITED STATES PATENTS 2,256,733    Cary et al. _____ Sept. 23, 1941

FOREIGN PATENTS 667,471    Great Britain _____ Mar. 5, 1952